US012303726B2

(12) United States Patent
Boraas

(10) Patent No.: US 12,303,726 B2
(45) Date of Patent: *May 20, 2025

(54) FALL-PROTECTION APPARATUS WITH PROTECTIVE SHROUD AND WITH SLEEVE ASSEMBLY

(71) Applicant: 3M INNOVATIVE PROPERTIES COMPANY, St. Paul, MN (US)

(72) Inventor: Michael A. Boraas, Zumbrota, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 869 days.

This patent is subject to a terminal disclaimer.

(21) Appl. No.: 17/517,894

(22) Filed: Nov. 3, 2021

(65) Prior Publication Data

US 2022/0054873 A1 Feb. 24, 2022

Related U.S. Application Data

(63) Continuation of application No. 16/495,224, filed as application No. PCT/IB2018/052143 on Mar. 28, 2018, now Pat. No. 11,213,705.

(60) Provisional application No. 62/480,807, filed on Apr. 3, 2017.

(51) Int. Cl.
*A62B 35/00* (2006.01)

(52) U.S. Cl.
CPC ...... *A62B 35/0075* (2013.01); *A62B 35/0093* (2013.01)

(58) Field of Classification Search
CPC .............. A62B 35/005; A62B 35/0043; A62B 35/0081; A62B 35/0093; A62B 35/0075
USPC ........................................................... 182/73
See application file for complete search history.

(56) References Cited

U.S. PATENT DOCUMENTS

| | | | | |
|---|---|---|---|---|
| 917,738 | A | 4/1909 | Opsal | |
| 991,608 | A | 5/1911 | Day | |
| 4,123,789 | A | 10/1978 | Shatavsky | |
| 5,359,797 | A * | 11/1994 | Williamson | G09F 11/29 40/904 |
| 5,549,329 | A * | 8/1996 | Wuerslin | A63C 11/222 280/821 |
| 6,299,040 | B1 | 10/2001 | Matias | |
| 6,651,362 | B2 * | 11/2003 | Caveney | G09F 3/20 40/638 |
| 6,823,617 | B2 | 11/2004 | Schweikert | |
| 7,843,349 | B2 * | 11/2010 | Rohlf | A01K 11/006 340/10.5 |
| 7,846,649 | B2 | 12/2010 | Tirosh | |

(Continued)

FOREIGN PATENT DOCUMENTS

| | | |
|---|---|---|
| CN | 205850021 | 1/2017 |
| JP | S56-123722 | 9/1981 |

(Continued)

OTHER PUBLICATIONS

DBI-Sala catalog, 2012, 158 pages.

(Continued)

*Primary Examiner* — Christopher Garft
(74) *Attorney, Agent, or Firm* — Kenneth B. Wood

(57) ABSTRACT

A fall-protection apparatus with a movable protective shroud and with a sleeve assembly, the sleeve assembly including an informational sheet that is compactable and extendable.

20 Claims, 9 Drawing Sheets

(56) References Cited

U.S. PATENT DOCUMENTS

| | | | | |
|---|---|---|---|---|
| 7,943,349 | B2 | 5/2011 | Sain | |
| 8,069,623 | B2 | 12/2011 | Colwell | |
| 8,226,024 | B2 | 7/2012 | Meillet | |
| 8,235,424 | B2 * | 8/2012 | Garcia | A63C 11/228<br>280/819 |
| 8,256,574 | B2 | 9/2012 | Griffiths | |
| 8,430,206 | B2 | 4/2013 | Griffiths | |
| 8,430,207 | B2 | 4/2013 | Griffiths | |
| 9,488,235 | B2 | 11/2016 | Casebolt | |
| 9,852,598 | B1 * | 12/2017 | Thompson | A62B 35/0093 |
| 10,792,524 | B2 * | 10/2020 | Thompson | A62B 1/06 |
| 2004/0049958 | A1 | 3/2004 | Eisen | |
| 2010/0226748 | A1 | 9/2010 | Wolner | |
| 2011/0084157 | A1 | 4/2011 | Meillet | |
| 2011/0278095 | A1 | 11/2011 | Hetrich | |
| 2014/0251722 | A1 | 9/2014 | Schurian | |
| 2018/0028848 | A1 | 2/2018 | Pass | |
| 2019/0374798 | A1 * | 12/2019 | Thompson | A62B 35/0093 |
| 2020/0360740 | A1 | 11/2020 | Jones | |

FOREIGN PATENT DOCUMENTS

| | | |
|---|---|---|
| WO | WO 2008-054887 | 5/2008 |
| WO | WO 2008-054889 | 5/2008 |
| WO | WO 2011/079266 | 6/2011 |

OTHER PUBLICATIONS

DBI-Sala User Instruction Manual, 2007, 40 pages.

Gemtor Lanyards and Lifelines, 4pages, <retrieved on Mar. 15, 2017 from http://gemtor.com/lanyard.htm>.

International Search report for PCT International Application No. PCT/IB2018/052143 mailed on Jun. 1, 2018, 4 pages.

* cited by examiner

FALL-PROTECTION APPARATUS WITH PROTECTIVE SHROUD AND WITH SLEEVE ASSEMBLY

BACKGROUND

Fall-protection apparatus such as e.g. self-retracting lifelines have often found use in applications such as building construction and the like.

SUMMARY

In broad summary, herein is disclosed a fall-protection apparatus comprising a load-bearing cable with a protective shroud and with a sleeve assembly, the sleeve assembly comprising an informational sheet. At least the shroud is movable at least between a first configuration in which the sleeve assembly resides within a through-passage of the shroud with the informational sheet in a compacted condition, and a second configuration in which the sleeve assembly resides outside the through-passage of the shroud so that the informational sheet is extendable from the compacted condition into an extended condition. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
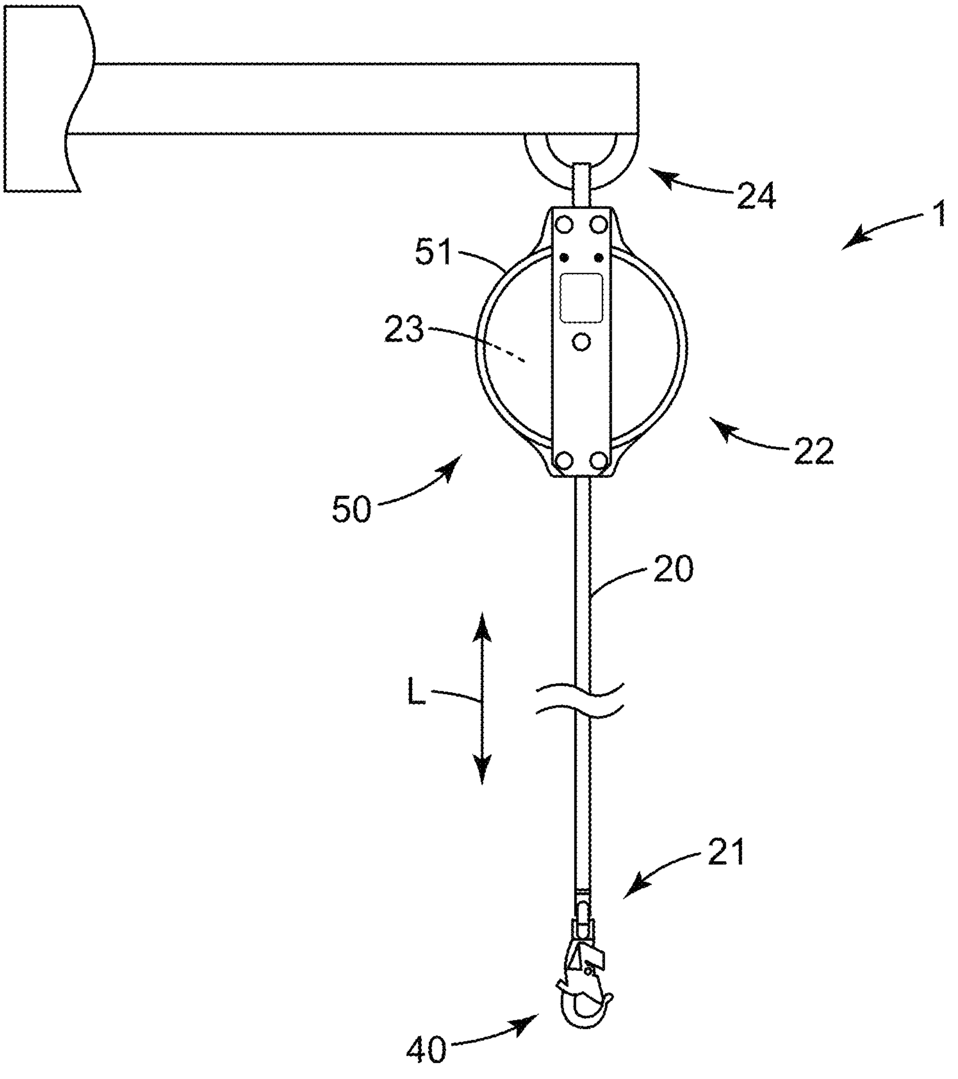
FIG. 1 is a side view of an exemplary fall-protection apparatus.

Like reference numbers in the various figures indicate like elements. Some elements may be present in identical or equivalent multiples; in such cases only one or more representative elements may be designated by a reference number but it will be understood that such reference numbers apply to all such identical elements. All figures and drawings in this document will be understood to be generic representations for the purpose of illustrating different embodiments of the invention and are not necessarily to scale. Thus, in the Figures the dimensions of the various items and components are depicted in illustrative terms only, and no relationship between the dimensions of the items and components should be inferred from the drawings, unless so indicated. Terms such as "top", bottom", "upper", lower", "under", "over", "horizontal", "vertical", and "up" and "down" will be understood to have their usual meaning with respect to the Earth. Terms such as "forward", "front", and the like, denote a direction toward the first end (i.e., the end bearing a fastener, e.g. a hook) of a cable of the fall-protection apparatus. Terms such as "rear", "rearward", and the like, denote an opposing direction, away from the fastener (and e.g. toward a base unit of the fall-protection apparatus if such a base unit is present). In use of the fall-protection apparatus, the forward direction will often correspond to a downward direction with respect to the Earth, and the rearward direction will often correspond to an upward direction. Use of words such as "diameter", "radial", "radially", "annular" and similar terms does not necessitate that the component that is referred to must exhibit a strictly circular geometry. In particular, the term "diameter" will be interpreted as signifying the diameter of an item with a circular cross-section, and as signifying the equivalent diameter of an item (e.g. a webbing with a relatively high aspect ratio of width to thickness) that does not have a circular cross-section.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. Terms such as "configured to", "configured so that", and similar characterizations are understood to require actual design intention to perform the specified function rather than mere physical capability of performing such a function.

DETAILED DESCRIPTION

Disclosed herein is a load-bearing cable (e.g. lifeline) 20 that can be used with (e.g., as part of) a fall-protection apparatus. Cable 20 comprises a protective shroud 60 and a sleeve assembly 80, both as discussed in detail later herein. In some embodiments, a fall-protection apparatus with which cable 20 is used may be a so-called self-retracting lifeline 1 as shown in generic exemplary embodiment in FIG. 1. Ordinary artisans will understand that a self-retracting lifeline (noting that this phrase is often applied to the entire fall-protection apparatus, not just to a load-bearing cable thereof) comprises a load-bearing cable 20 that can be unwound from a base unit 50 which may be secured to an anchorage 24 (e.g. of a building under construction). A first end 21 of cable 20 may be attachable, e.g. by way of a fastener (e.g. hook) 40, to a harness of a human user of apparatus 1. Base unit 50 may comprise a housing 51 with a reel (drum) 23 to which a second end 22 of cable 20 is attached. Cable 20 can be unwound from reel 23 of base unit 50 to follow a user as the user moves about a workplace, with reel 23 being biased so that the reel retracts cable 20 back into housing 51 and rewinds it onto reel 23 as the user moves toward base unit 50. Apparatus 1 (e.g. housing 51 and reel 23 thereof) can include e.g. a centrifugal brake that is triggered in the event of rapid unwinding of cable 20 (e.g. in the event that the user falls) to safely bring the user to a halt. Fall-protection apparatus such as self-retracting lifelines are described in various aspects in U.S. Pat. Nos. 7,843,349, 8,256,574, 8,430,206, 8,430,207, and 9,488,235. In some embodiments fall-protection apparatus 1 is a self-retracting lifeline which meets the requirements of ANSI Z359.14-2012.

In various other embodiments, fall-protection apparatus 1 may comprise e.g. a horizontal lifeline or retractable horizontal lifeline, a positioning lanyard, a shock-absorbing lanyard, a rope adjuster or rope grab, a load arrester, a vertical safety system (such as e.g. a flexible cable, rigid rail, climb assist, or fixed ladder safety system), a confined-space rescue system or hoist system, and so on. It will be understood that some fall-protection apparatus 1 may comprise a base unit that differs from the base units that are customarily used in self-retracting lifelines. For example, such a base unit may not comprise a centrifugal brake and/or it may not comprise a reel upon which the cable is windable. In some cases cable 20 may merely be engaged with one or more components of the base unit (e.g. in a way that allows cable 20 to slidably move through the base unit when desired) rather than being attached to a component of the base unit (e.g. reel) in the manner of a self-retracting lifeline. In some embodiments, no base unit may be present; for example, in some cases a load-bearing cable 20 (e.g. along with one or more fasteners at one or both ends of cable 20) may serve as a fall-protection apparatus. It will be understood that any such fall-protection apparatus may include, or be used with, various ancillary items which are not described in detail herein. Such items may include, but are not limited to, one or more of lanyards, centrifugal brakes, shock absorbers, tear strips, harnesses, belts, straps, paddings, tool holsters or pouches, impact indicators, carabiners, D-rings, anchorage connectors, and the like. Many such apparatus, products, and components are described in detail e.g. in the 3M DBI-SALA Full-Line Catalog (Fall 2016).

Load-bearing cable 20 will comprise an elongate length and a longitudinal axis (denoted as axis L in various Figures). Cable 20 may take any suitable form as long as it is load-bearing. By load-bearing is meant that in ordinary use of a fall-protection apparatus 1 with which cable 20 is used, cable 20 is capable of bearing a load imparted by a human user (e.g. an adult human weighing at least 150 pounds) of the fall-protection apparatus. It will be appreciated that in some circumstances (e.g., when used to arrest a fall), cable 20 may at least momentarily bear a dynamic load that is somewhat greater than the actual weight of the human user.

Cable 20 may take any form and may be made of any suitable material. In some embodiments, cable 20 may be a metal cable, e.g. a twisted or braided metal cable (often referred to as a wire rope). Suitable materials for a metal cable may include e.g. stainless steel and galvanized steel. In other embodiments, cable 20 may take the form of a rope comprised of twisted or braided organic polymeric strands, plies, or fibers. Such a cable may be comprised of any suitable organic polymer or polymers, and in particular embodiments may be comprised of aramids (e.g. as available under the trade designations TECHNORA, KEVLAR or NOMEX), nylons, polyesters (e.g. fibers available under the trade designation VECTRAN), and so on. It will thus be understood that the term cable is used broadly and does not imply any particular composition or geometry, as long as the cable is load-bearing as described above. In many embodiments, cable 20 may exhibit an at least generally circular cross-section. In other embodiments, at least a portion of cable 20 that is proximal to first end 21 of cable 20 (and that may include first end 21), may take the form of a lanyard comprised of webbing that exhibits a cross-section with a relatively high aspect ratio of width to thickness. Such a lanyard/webbing may be comprised of any suitable material, e.g. any of the organic polymeric materials listed above. Such a lanyard may provide the entire length of cable 20; or, it may provide only a first-end portion of cable 20 and may be coupled to a length of wire rope or polymeric rope that provides the majority of the length of cable 20. It will thus be appreciated that the concept of a cable 20 embraces multisegment arrangements (e.g. a terminal lanyard joined to a wire rope). Cable 20 may have any suitable length. In various embodiments, cable 20 may have a total length that is at least about 10, 15, 25, 35, 45, or 55 feet; in further embodiments, the total length may be no more than about than 20, 30, 50, 100, 150, 200, 300, or 500 feet. In various embodiments, cable 20 may exhibit a minimum breaking strength of at least about 310, 900, 1800, 3600, 5000, 5400, 7000, or 9000 $lb_f$.

Figure 2:
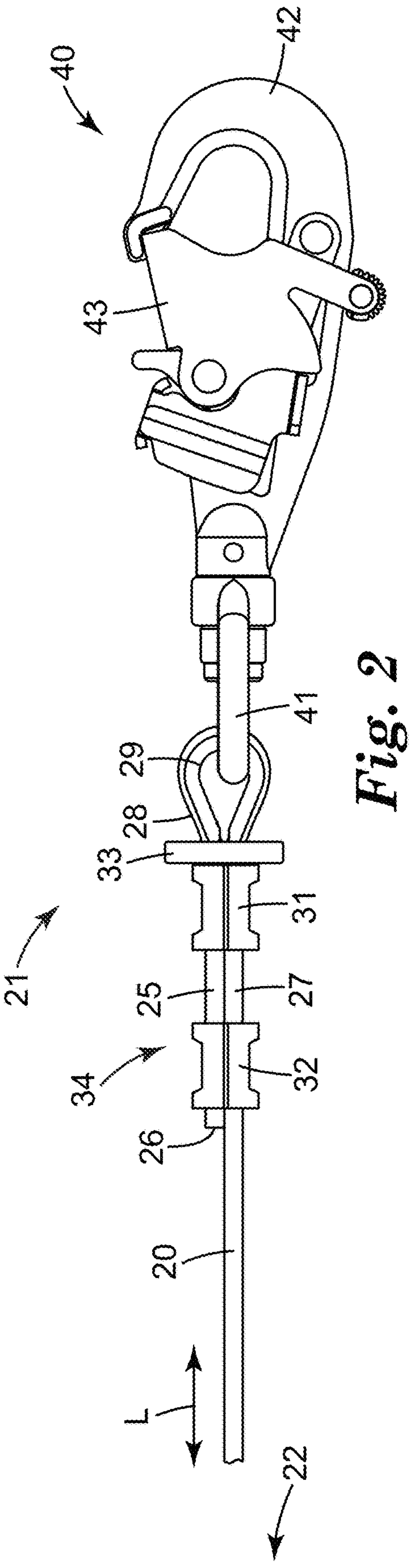
FIG. 2 is a side view of a first end of a cable of an exemplary fall-protection apparatus.

A first end 21 of cable 20 may comprise at least one fastener 40 (as shown in exemplary embodiment in FIG. 2) by which first end 21 of cable 20 can be attached to any desired item, e.g. to a harness of a user of apparatus 1 or to an anchorage connector. Fastener 40 may take any suitable form, e.g. a hook, a carabiner, a D-ring, and so on. In some embodiments fastener 40 may comprise a hook portion and a hingedly openable (e.g., thumb- or finger-actuatable) gate 43, as shown in exemplary embodiment in FIG. 2. In some embodiments fastener 40 may be self-engaging, meaning that fastener 40 may be engaged to a component (e.g. a D-ring) of a wearable harness merely by appropriately pressing a hingedly openable gate of the fastener 40 against the component. In many embodiments, such a fastener may be self-locking if the hinged gate is biased (e.g. spring-loaded) to snap shut after allowing passage of a component through the gap created when the gate is opened. Many such fasteners may allow one-handed operation. If desired, one or more swivelable connections may be provided (e.g. between an eyebolt of fastener 40, and a hook portion 42 of fastener 40), so that the hook portion can rotate freely as necessitated e.g. by movements of a user. It is noted that the specific fastener shown in FIG. 2 is merely an exemplary embodiment and any suitable fastener may be used. In many embodiments, at least some components of fastener 40 may be made of metal, e.g. steel or the like.

Fastener 40 may be secured to first end 21 of cable 20 in any suitable manner. Often, a fastener 40 may remain with cable 20 over the life of the fall-protection apparatus unless replaced; if so, the securing of fastener 40 to cable 20 may be e.g. permanent or quasi-permanent rather than being configured e.g. for quick release in the field. One such exemplary arrangement for securing a fastener 40 to a first end 21 of cable 20 is depicted in FIG. 2 (in which a protective shroud and a sleeve assembly are omitted for ease of depiction of the components of cable 20 and fastener 40). In arrangements of this type, a terminal section 25 of cable 20 may be passed through an aperture 41 (e.g. an eyebolt) of fastener 40 and turned back onto itself to form a terminal loop 28 at first end 21 of cable 20, from which terminal loop 28 fastener 40 extends. Terminal section 25 of cable 20 may be brought into close abutment (e.g. brought into contact with) a penultimate section 27 of cable 20. Section 25 may be affixed or otherwise joined to section 27, so as to form a junction of these sections of cable 20. In some embodiments (e.g. when at least a terminal portion of cable 20 comprises a wire rope) one or more fittings may be used for this purpose (two such fittings, 31 and 32, are used in the exemplary arrangement of FIG. 2.) Any suitable fitting or fittings may be used, e.g. a compression fitting in the form of a sheath, ferrule, or swage fitting (made e.g. of any suitable metal, e.g. steel or the like). Exemplary compression fittings that may be suitable include products available under the trade designation NICOPRESS.

In some embodiments (e.g. when at least a terminal portion of cable 20 comprises an organic polymeric rope), terminal section 25 of cable 20 may be joined to penultimate section 27 by being spliced thereto e.g. to form an eye splice. This may be achieved e.g. by partially untwisting strands of terminal section 25 and/or strands of penultimate section 27 and then interweaving, threading, or otherwise entangling strands of section 25 with strands of section 27. In some embodiments (e.g. when at least a terminal portion of cable 20 comprises an organic polymeric webbing), terminal section 25 may be joined to penultimate section 27 by stitching. In specific embodiments, the terminal and penultimate sections are joined together by one or more compression fittings, by splicing, and/or by stitching, not by way of the terminal section being tied to the penultimate section in a knot. In particular embodiments, fastener 40 is not secured to cable 20 by way of first end 21 of cable 21 being directly knotted to fastener 40. If desired, in some embodiments a thimble (an arcuate, protective channel) 29 may be provided at least along interior portions of the thus-formed loop 28 of cable 20 e.g. for enhanced abrasion resistance, as shown in exemplary embodiment in FIG. 2.

Figure 3:
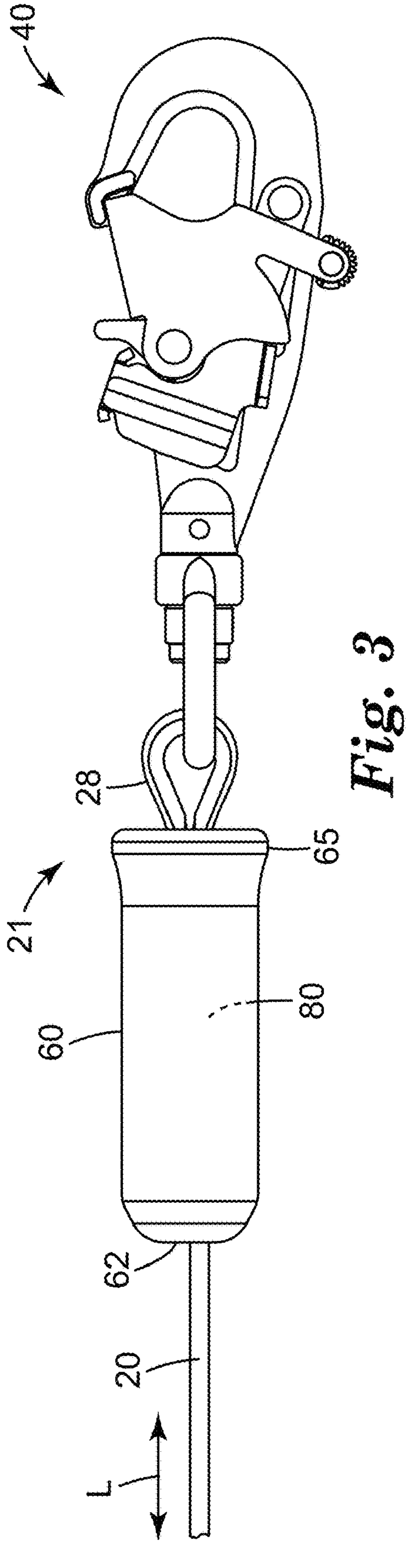
FIG. 3 is a side view of a first end of a cable of an exemplary fall-protection apparatus, with a protective shroud and sleeve assembly in place.

Cable 20 comprises a protective shroud 60 (omitted from FIGS. 1 and 2, but shown in FIG. 3). With reference to FIGS. 2 and 3, it will be evident that such a shroud, when fitted at first end 21 of cable 20 as in FIG. 3, can cover some or all of junction 34 of cable 20, for purposes which may be utilitarian and/or aesthetic. For example, in embodiments of the general type depicted in FIGS. 2 and 3, such a protective shroud 60 may advantageously protect a human user e.g. from contacting edges of fittings 31 and 32, and/or from contacting first-end terminus 26 of cable 20. Such a shroud can also serve as a "bumper" to prevent fastener 40 (or, in general, any item at first end 21 of cable 20) from entering a housing of a base unit in the event that cable 20 is retracted into the housing.

Figure 4:
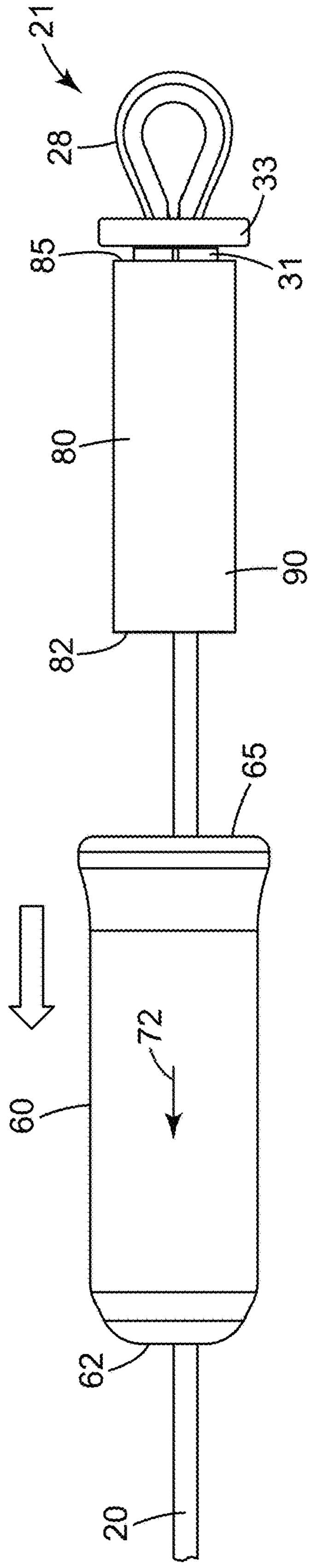
FIG. 4 is a side view of the first end of the cable of FIG. 3, with the protective shroud having been slidably moved along the cable to reveal the sleeve assembly.

As disclosed herein, a protective shroud 60 can also contain and protect a sleeve assembly 80, which is visible in FIG. 4 in which protective shroud 60 has been slidably moved rearward along cable 20 (away from first end 21) to expose sleeve assembly 80. (In FIG. 4 and subsequent Figures, fastener 40 has been omitted for ease of presentation of other features of cable 20.) Sleeve assembly 80 comprises an informational sheet 90 that may include various information as discussed later herein. It will be appreciated that providing such an informational sheet at first end 21 of cable 20, rather than e.g. providing the informational sheet on a housing of a base unit, can allow a user of apparatus 1 to view and consult the informational sheet without having to access the base unit. This may be particularly advantageous in embodiments in which cable 20 is used as part of a fall-protection apparatus that is a self-retracting lifeline, in which case the base unit of the apparatus may be positioned at an elevated (e.g. hard to reach) location. Furthermore, the arrangements disclosed herein allow such an informational sheet to reside in a protected location (within the shroud) during use of apparatus 1 so that the informational sheet is unlikely to be caught, snagged, ripped, or otherwise damaged during use of apparatus 1. However, the informational sheet is easily accessible merely by moving protective shroud 60 (e.g. by slidably moving shroud 60 rearwardly along cable 20) to expose sleeve assembly 80, at any desired time. It is still further noted that disposing an informational sheet in this manner, particularly in a compacted condition as described later herein, can make available substantially more area for displaying information than may be available e.g. in an informational label that is adhered to a housing of a base unit of a fall-protection apparatus.

Protective shroud 60 is annularly mounted on cable 20, meaning that protective shroud 60 comprises a through-passage (e.g., passage 69 as visible in FIG. 6) through which an elongate section of cable 20 extends and with protective shroud 60 thus radially surrounding the section of cable 20 that is located within the through-passage 69. Shroud 60 comprises a long axis that, when shroud 60 is mounted on cable 20, is at least generally aligned with longitudinal axis L of cable 20, as shown in several of the Figures. Through-passage 69 of shroud 60 is provided in combination by first opening 66 located at first, forward (fastener-facing) end 65 of shroud 60, by second opening 63 located at second, rear end 62 of shroud 60, and by interior cavity 68 which is fluidly connected with openings 66 and 63. Through-passage 69 (e.g. interior cavity 68 thereof) is sized and shaped so that when shroud 60 is in place proximate first end 21 of cable 20 (e.g. so that first end 65 of shroud 60 abuts against annular spacer disk 33 of cable 20), at least a portion, or all, of junction 34 of cable 20 will reside within through-passage 69 of protective shroud 60. In embodiments of the type depicted in FIGS. 2 and 3, protective shroud 60 can shield items such as e.g. fittings 31 and 32 and/or a first-end terminus 26 (which may comprise exposed ends of wire strands) of cable 20 from being contacted by a user.

However, through-passage 69 and in particular interior cavity 68 thereof, are oversized so that in addition to an elongate section of cable 20 (including at least a portion of a junction 34 of cable 20, and any fittings present thereon) being positionable therewithin, sleeve assembly 80 can also be positioned within through-passage 69. Such capability will be evident from comparison of FIG. 4, in which shroud 60 has been slidably moved rearward along cable 20 (to the left as viewed, as indicated by the block arrow) so that sleeve assembly 80 is exposed, to FIG. 3, in which shroud 60 has been moved forward (toward the right) so that the above-described elongate section of cable 20, as well as sleeve assembly 80, are positioned within through-passage 69.

The arrangements disclosed herein provide that protective shroud 60 and sleeve assembly 80 are movable relative to each other. In many embodiments, shroud 60 and sleeve assembly 80 may be slidably movable relative to each other along cable 20, along a direction aligned with the longitudinal axis "L" of cable 20 and aligned with the long axis of protective shroud 60. Regardless of the exact manner of their moving, shroud 60 and sleeve assembly 80 are movable relative to each other between at least a first configuration (as shown in FIG. 3) in which sleeve assembly 80 resides within through-passage 69 of shroud 60, and a second configuration (as shown in FIG. 4) in which sleeve assembly 80 resides outside through-passage 69 of shroud 60. In some embodiments, the condition that shroud 60 and sleeve assembly 80 are movable relative to each other may be met by way of only shroud 60 being movable (e.g. slidably movable) along cable 20 (with sleeve assembly 80 being fixed on cable 20). In other embodiments, shroud 60 may be movable and sleeve assembly 80 may also be movable (e.g. slidably movable) along cable 20.

It will be appreciated that when shroud 60 and sleeve assembly 80 are in the first configuration, shroud 60 annularly (radially) surrounds sleeve assembly 80, and a sleeve 81 of sleeve assembly 80 (visible e.g. in FIG. 8) annularly surrounds an elongate section of cable 20 that extends through a through-passage of sleeve 81 of sleeve assembly 80. In other words protective shroud 60, sleeve assembly 80, and an elongate section of cable 20, form an annularly nested structure.

It will be appreciated from FIG. 3 that when shroud 60 and sleeve assembly 80 are in their first configuration (in which sleeve assembly 80 is annularly nested within through-passage 69 of shroud 60), they can be positioned so that at least a portion of junction 34 of cable 20, including one or more fittings if present at first end 21 of cable 20, reside within the through-passage 69 of shroud 60. (In the specific arrangement of FIG. 3, both fittings 31 and 32 reside within passage 69.) Such an arrangement of shroud 60 will be referred to herein as shroud 60 being in a shielding position. It will be appreciated from FIG. 4 that starting with shroud 60 and sleeve assembly 80 in their positions shown in FIG. 3, shroud 60 can be slidably moved rearward along cable 20 so that shroud 60 and sleeve assembly 80 are in their second configuration as in FIG. 4, without moving sleeve assembly 80 from its original position. Such an arrangement of sleeve assembly 80, in which at least a portion of junction 34 of cable 20, including one or more fittings if present at first end 21 of cable 20, resides at least partially within a through-passage of the sleeve of the sleeve assembly, will be referred to herein as sleeve assembly being in a shielding position. The requirement that one or more fittings need only be located at least partially within a through-passage of the sleeve assembly is in view of the exemplary arrangement of FIG. 4, in which one fitting (fitting 32) is located entirely within a through-passage of the sleeve assembly, but another fitting (fitting 31) is located only partially within this through-passage; that is, a small section of fitting 31 is visible outside of the through-passage of sleeve assembly 80.

It is evident from FIG. 4 that slidably moving shroud 60 rearward along cable 20 so that shroud 60 and sleeve assembly 80 are in their second configuration will be sufficient to expose sleeve assembly 80 so that informational sheet 90 of sleeve assembly 80 may be e.g. visually inspected. In some embodiments, this may be done without sleeve assembly 80 being slidably moved rearward along cable 20 away from its original position of FIG. 3. Thus in some embodiments sleeve 81 may not be slidably movable along cable 20. At least in such embodiments, at least a portion of sleeve 81 (discussed in detail below) of sleeve assembly 80 may be transparent in order to facilitate visual inspection of junction 34 and in particular to allow inspection of any fittings that are present on junction 34.

However, in other embodiments sleeve assembly 80 is slidably movable along cable 20, so that sleeve assembly 80 can be moved rearward along cable 20 (as indicated by the block arrow in FIG. 5) to expose junction 34, including any or all fittings (e.g. fittings 31 and 32) that may be present, as well as to expose first-end terminus 26 of cable 20. In other words, in an arrangement of the type shown in FIG. 5, both protective shroud 60 and sleeve assembly 80 are in a non-shielding position. This allows that items such as e.g. junction 34, fittings 31 and 32 and/or terminus 26 of cable 20, and so on, may be visually inspected as desired, regardless of whether or not sleeve 81 of sleeve assembly 80 is transparent.

During ordinary operation of fall-protection apparatus 1, protective shroud 60 and sleeve assembly 80 may typically remain in the arrangement of FIG. 3, in which they are in their first configuration (in which sleeve assembly 80 resides within through-passage 69 of shroud 60). Often, during ordinary use of apparatus 1, shroud 60 (and sleeve assembly 80) will be in a maximally forward position, meaning that they are located as far forward along cable 20 as is possible, e.g. so that first end 65 of shroud 60 contacts annular spacer disk 33. In such an arrangement, junction 34 will be located within through-passage 69 of protective shroud 60 and at least a portion of junction 34 will be located within a through-passage of sleeve assembly 80. Such an arrangement will be referred to herein as shroud 60 and sleeve assembly 80 being in a co-shielding position. In such an arrangement, any first-end fitting of cable 20 will be located at least partially within a through-passage of the sleeve assembly and will be located completely within through-passage 69 of protective shroud 60. Informational sheet 90 will be hidden within through-passage 69 of protective shroud 60 (so that sheet 90 cannot be expanded from a compacted position while it is contained within through-passage 69); and, any fittings, and the first-end terminus 26 of cable 20, are protected from being contacted by a user.

When a user desires to access informational sheet 90 of sleeve assembly 80, protective shroud 60 can be slidably moved rearward e.g. as shown in FIG. 4 so that shroud 60 and sleeve assembly 80 are in their second configuration so that sleeve assembly 80 is exposed. Informational sheet 90 of sleeve assembly 80 may then be extended (e.g. unwound) to the extent necessary to consult the information thereon. After the informational sheet is consulted, the sheet may be compacted so that it (along with sleeve 81) will fit within the through-passage of protective shroud 60 and shroud 60 may be slidably moved forward, back to the position shown in FIG. 3.

Figure 5:
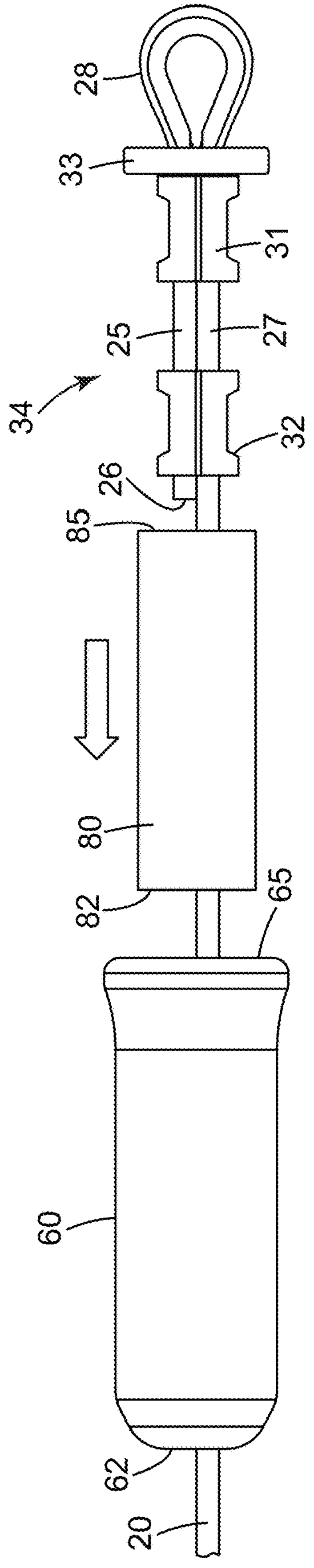
FIG. 5 is a side view of the first end of the cable of FIG. 4, with the protective shroud having been slidably moved further along the cable and with the sleeve assembly also having been slidably moved along the cable.

In some cases a user may wish to slidably move sleeve assembly 80 rather than slidably moving only protective shroud 60. For example, the user may wish to visually inspect one or more components (e.g. fittings 31 and 32) at first end 21 of cable 20. Or, the user may wish to move sleeve assembly 80 away from any such fittings so that sleeve assembly 80 can rotate more easily about cable 20 to facilitate unwinding of the informational sheet from the sleeve assembly. In such cases, sleeve assembly 80 may be slidably moved rearward along cable 20 as shown in FIG. 5. During an inspection of first end 21 of cable 20, shroud 60 and sleeve assembly 80 may be held in spaced-apart (non-nested) non-shielding positions along cable 20, in similar manner to that shown in FIG. 5. However (e.g. if it is not necessary to consult the informational sheet during an inspection of first end 21 of cable 20), in some cases shroud 60 and sleeve assembly 80 may be held in an annularly nested condition (i.e., in their first configuration), while they are in a non-shielding position to allow first end 21 of cable 20 to be inspected. Shroud 60 and sleeve assembly 80 may then be returned (either one at a time; or, simultaneously, in an annularly nested condition) to their co-shielding position of FIG. 3 at the end of such an inspection.

Figure 6:
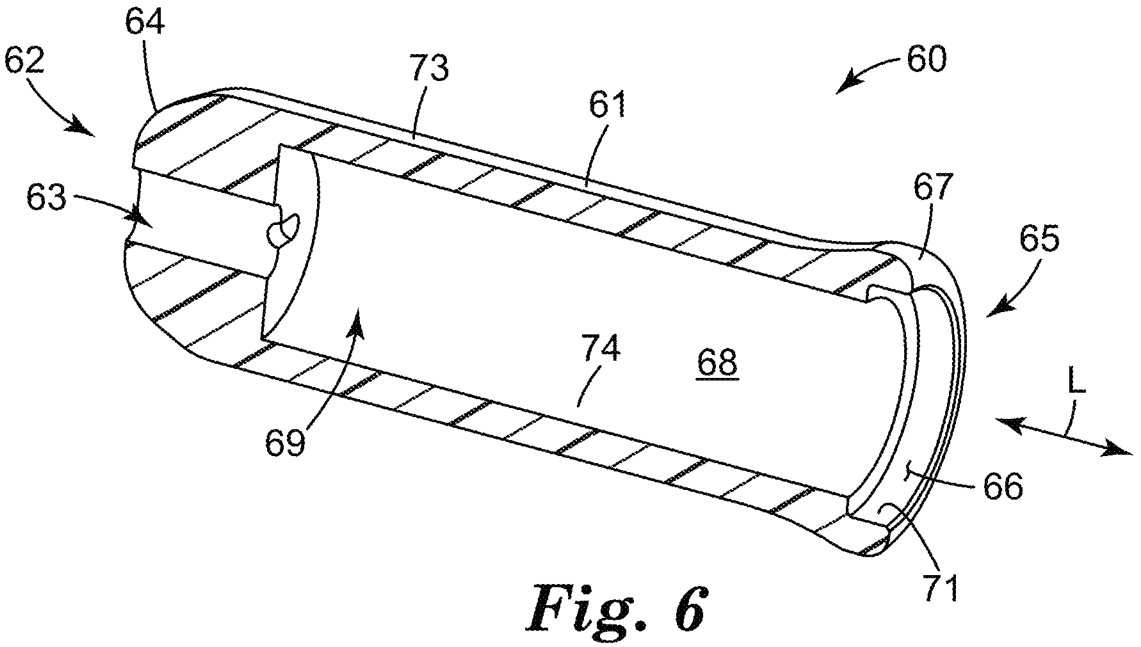
FIG. 6 is an isolated cross-sectional perspective view of the exemplary protective shroud of FIG. 3.

With reference to FIG. 6, in some embodiments protective shroud 60 may comprise a first, forward-facing (fastener-facing) end 65 with a first opening 66 and a second, oppositely-facing end 62 with a second opening 63 that is smaller in diameter than the first opening. First and second openings 66 and 63, and interior cavity 68 that lies between openings 66 and 63 and that fluidly connects the two, collectively define the aforementioned through-passage 69 of protective shroud 60. The smaller size of second opening 63 can provide that sleeve assembly 80 can pass through first opening 66 of protective shroud 60 to enter interior cavity 68 (and to exit interior cavity 68), while not allowing sleeve assembly 80 to pass through second opening 63 to exit interior cavity 68. It may be convenient that second opening 63 be sized to be somewhat larger than the diameter of cable 20 so that cable 20 can pass through opening 63 easily as protective shroud 60 is slidably moved along cable 20; however, it may be advantageous that second opening 63 be sufficiently small that the two abutted sections 25 and 27 of cable 20 (that form junction 34 of cable 20) cannot pass through opening 63. This can ensure that terminus 26 of cable 20 cannot protrude through opening 63 so as to be exposed.

In some embodiments protective shroud 60 may comprise a main body portion 61 (e.g. with a relatively constant outer diameter), a tapered nose 64 at second end 62, and a flared skirt 67 at first end 65, all as shown in exemplary embodiment in FIG. 6. Shroud 60 comprises a radially outer surface 73 which may be suitable for grasping by a user to slidably move shroud 60 as desired (and which may optionally comprise a textured surface to enhance gripping), and a radially inner surface 74 that defines interior cavity 68 of shroud 60. In some embodiments main body portion 61, tapered nose 64 and flared skirt 67 may all be portions of a single, integrally-molded piece. In some embodiments such a molded piece may be comprised of a resilient, organic polymeric resin (e.g. an injection-molded resin), e.g. with a Shore A hardness of less than about 80, 70, 60, or 50.

In some embodiments, when protective shroud 60 and sleeve assembly 80 are in a co-shielding position (as in FIG. 3) a radially-inward-facing surface 71 (visible in FIG. 6) of shroud 60 that defines first opening 66 of first end 65 of shroud 60, can radially outwardly abut a radially-outward surface (visible in FIG. 2) of an annular spacer disk 33 that is mounted on cable 20 between fitting 31 of cable 20 and terminal loop 28 of cable 20. This can provide a friction fit between first end 65 of shroud 60 and the annular spacer disk 33. Since annular spacer disk 33 is restrained (either by being abutted against fitting 31, or by being fixed to cable 20) from moving along cable 20, this friction fit can serve to keep shroud 60 in a shielding position (e.g. in the position of FIG. 3) unless force is exerted by a user to overcome the friction fit and to move shroud 60 rearwardly away from first end 21 of cable 20.

Figure 7A:
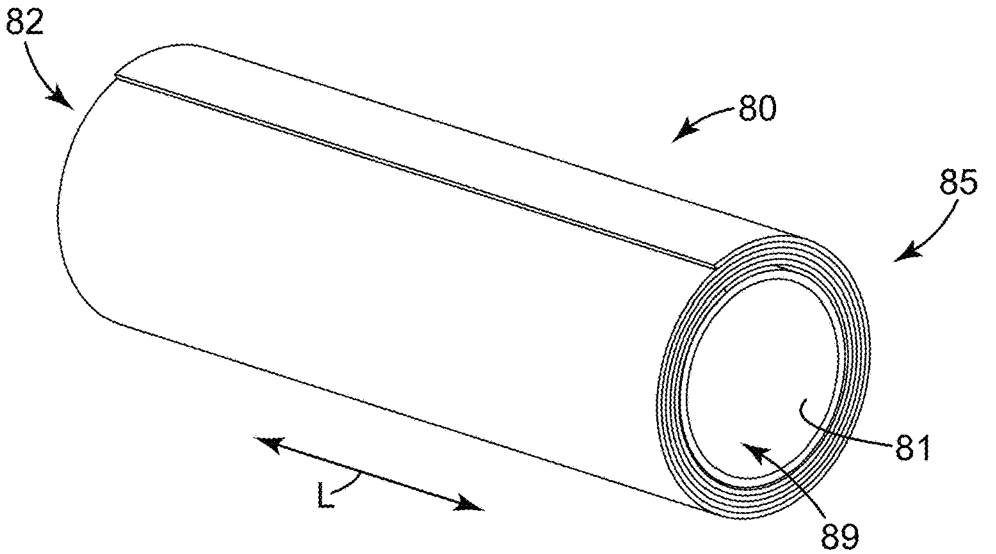
FIG. 7*a* is an isolated perspective view of the exemplary sleeve assembly of FIGS. 4 and 5, with an informational sheet of the sleeve assembly in a compacted (spiral-wound) condition.
Figure 7B:
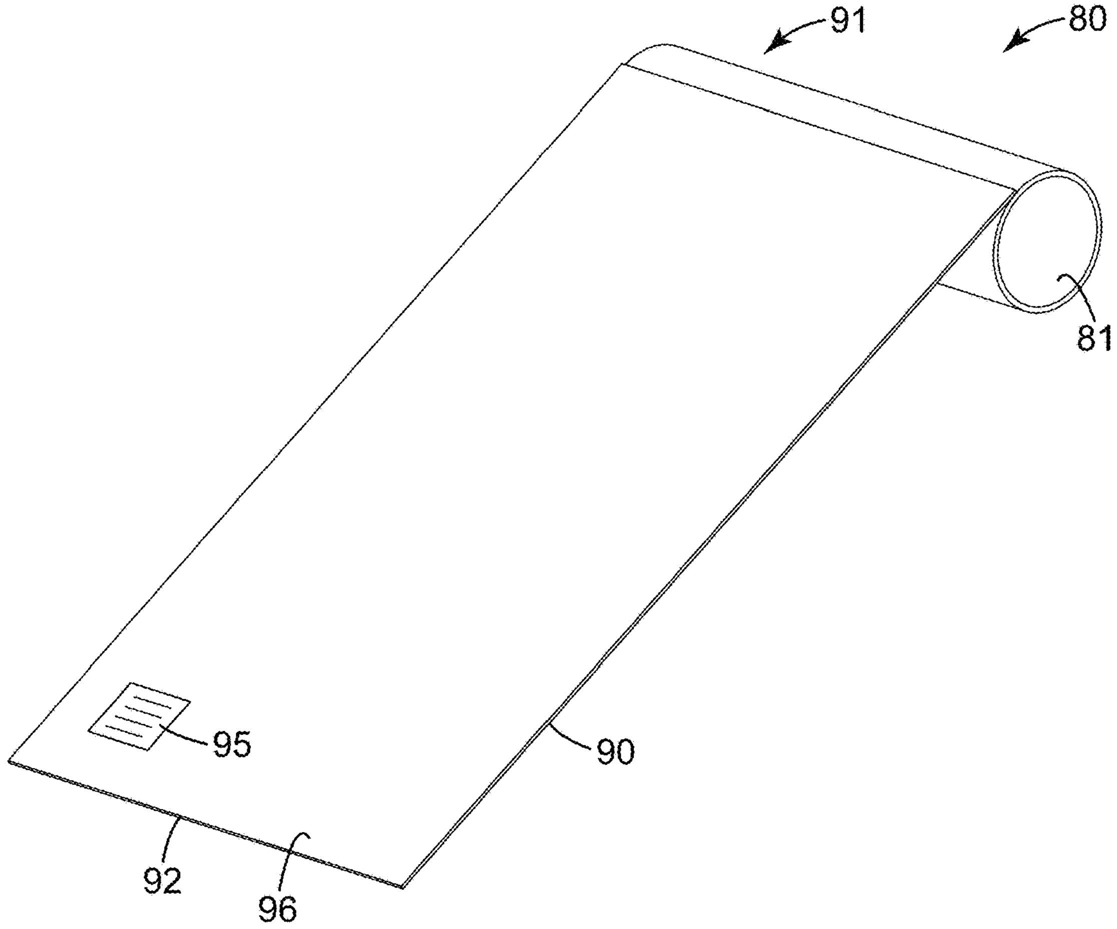
FIG. 7*b* is an isolated perspective view of the exemplary sleeve assembly of FIG. 7*a*, with the informational sheet of the sleeve assembly having been extended (unwound) to an at least partially extended condition.
Figure 8:
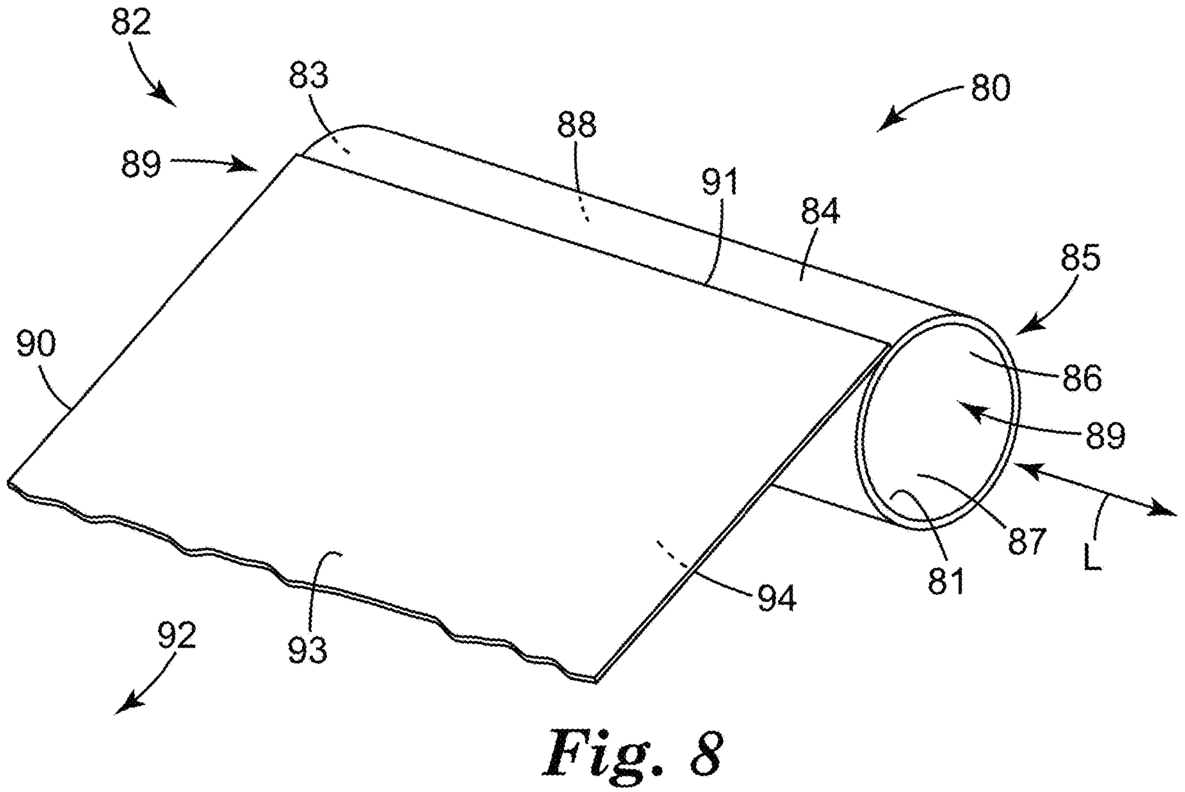
FIG. 8 is a magnified isolated perspective view of a portion of the exemplary sleeve assembly of FIG. 7*b*.

With reference to FIGS. 7*a*, 7*b* and 8, sleeve assembly 80 comprises a sleeve 81 that is annularly mounted on cable 20 at a position proximate first end 21 of cable 20. In some embodiments, sleeve assembly 80, and in particular sleeve 81 thereof, is slidably movable along at least a portion of cable 20 as noted above. An informational sheet 90 is disposed on an outward surface 84 of sleeve 81 and comprises an attachment end 91 that is attached to sleeve 81 (e.g. to outward surface 84 of sleeve 81). Informational sheet 90 can be disposed in a compacted condition (e.g. spiral-wound around a radially outward surface 84 of sleeve 81), and can be extended to an extended condition, as discussed later herein.

In some embodiments, sleeve 81 may comprise an elongated body (e.g. a hollow tube) with a long axis that is at least generally aligned with the long axis of shroud 60 and with the longitudinal axis of cable 20. Sleeve 81 may comprise a radially inward surface 87 that defines an interior cavity 88, a first, forward end 85 with a first opening 86, and a second, rearward end 82 with a second opening 83. Cavity 88 and first and second openings 86 and 83 collectively define a through-passage 89 of sleeve assembly 80, within which through-passage an elongate section of cable 20 resides when sleeve assembly 80 is annularly mounted on cable 20. The inner diameter of sleeve 81 (defined by radially inward surface 87) should be sufficiently larger than the diameter (or, in general, the largest non-long-axis dimension) of cable 20 so that sleeve assembly 80 may be easily slidably moved along cable 20. In particular, the inner diameter of sleeve 81 should be sufficiently large that at least a portion of junction 34 of cable 20 (including e g at least one fitting, if present) is able to reside at least partly within through-passage 89 of sleeve 81. Sleeve 81 may be made of any suitable material, e.g. a molded piece of organic polymeric resin or an elongate section of extruded hollow tubing, and may comprise any suitable outer diameter or equivalent diameter, e.g. 1.0, 1.5, 2.0, 2.5, or 3.0 cm. In some optional embodiments, sleeve 81 may comprise a hinged clamshell structure that can be opened, mounted on cable 20, and closed and latched or otherwise secured in the closed position, to provide sleeve 81. Such arrangements may be useful for example if it is desired to mount a sleeve assembly 80 on a cable 20 of an existing apparatus 1 without having to disconnect a fastener 40 from cable 20 or to disengage cable 20 from a base unit. In some optional embodiments, rather than a sleeve 81 being provided e.g. by a hollow tube that is separately made from informational sheet 90 and to which informational sheet 90 is attached, a radially innermost layer or spiral-wound layers of sheet 90 may serve as a sleeve 81 that is integral with sheet 90 and to which the unwindable portion of the sheet is connected. In such embodiments such layers may be self-bonded to each other so that these layers cannot be unwound but rather form a permanent cylindrical sleeve. In some particular embodiments of this type an integral sleeve 81 of informational sheet 90 will be slidably movable along cable 20. That is, in such embodiments an integral sleeve 81 of sheet 90 (as well as all other portions of informational sheet 90) will not be attached to cable 20 in any such way as would prevent sheet 90 from slidably moving relative to cable 20.

In some optional embodiments, rather than sleeve 81 being a tube of constant outer diameter as in FIGS. 7*a*, 7*b* and 8, sleeve 81 may optionally include at least one flange that extends radially outward e.g. to at least the outer diameter of spiral-wound informational sheet 90. Such a flange may be provided at one or both of ends 82 and 85 of sleeve 81. Such a flange may provide that when protective shroud 60 is slidably moved relative to sleeve assembly 80, protective shroud 60 does not cause outward layers of spiral-wound sheet 90 to slide relative to inward layers of spiral-wound sheet 90, along the direction of motion of shroud 60. In other words, such a flange may minimize any chance of spiral-wound sheet 90 "telescoping" due to motion of protective shroud 60. Of course, the diameter of interior cavity 68 of shroud 60 (and of opening 66 of shroud 60) may be chosen to be sufficiently larger than the outer diameter of spiral-wound sheet 90, to minimize any such telescoping, whether or not any such flange is present.

Informational sheet 90 may comprise any sheet-like material that is suitable for presenting e.g. visual information, whether such information is to be inspected by a human observer and/or to be interrogated by an optical or optoelectronic interrogation device. Informational sheet 90 may be a multilayer sheet (e.g. comprising an ink-receptive layer and a transparent protective overlayer) if desired. In some embodiments, information may be present on one or both major surfaces 93 and 94 of sheet 90. In various embodiments, sheet 90 may include information such as the serial number of apparatus 1, the manufacturing date of apparatus 1, the date at which apparatus 1 is due for inspection or service, contact information, instructions for operation of apparatus 1 (e.g. instructions for performing a check to confirm that a centrifugal brake of a self-retracting lifeline 1 is functioning properly), and the like. In some embodiments, sheet 90 may include at least one optically interrogatable indicia such as a barcode and/or a QR code (matrix barcode). In some embodiments, sheet 90 may include at least one writable area that can serve e.g. as an inspection or maintenance log (e.g. in which area may be recorded dates on which apparatus 1 was inspected or serviced).

Informational sheet 90 may be attached to sleeve 81 to form sleeve assembly 80 in any suitable manner. For example, a strip of double-faced pressure-sensitive adhesive may be provided between major surface 94 of sheet 90 and radially-outward surface 84 of sleeve 81, proximate end 91 of sheet 90, to adhesively bond the two surfaces together. In some cases, a strip of single-faced adhesive (e.g., an adhesive tape) may be bonded to major surface 93 of sheet 90 and to outward surface 84 of sleeve 81, overlapping the terminal edge of attachment end 91 of sheet 90. In some embodiments both of these may be used in combination. In other embodiments, a thin coating (e.g. a bead) of liquid adhesive may be used to attach end 91 of sheet 90 to sleeve 81. Any suitable liquid adhesive may be used, and may be hardened by any suitable means (e.g. by photocuring, thermal curing, by loss of solvent or water, and so on). Any other method of attachment (e.g. mechanical methods such as stapling or the like) may be used. Any such methods and components may be used in combination.

Informational sheet 90 is configured so that it can be maintained in a compacted condition so that sheet 90 (and sleeve 81) can reside within a through-passage 69 of a protective shroud 60. At a desired time, protective shroud 60 may be slidably moved along cable 20 so that sleeve assembly 80 is exposed, and sheet 90 may be extended from its compacted condition, into an at least partially extended condition that allows information that is present (e.g. printed) on sheet 90 to be visually interrogated. If desired, sheet 90 may be extended into a fully extended condition in which e.g. substantially all of sheet 90 is in a generally planar condition. In some embodiments, sheet 90 may be fan-foldable (e.g., pleated) so that it can be bunched (accordionized) into a compacted condition, and can be extended (e.g. pulled) therefrom into a partially, or fully, extended condition at a desired time. In such embodiments, through-passage 69 of protective shroud 60 may be sized and shaped to accept both a sleeve 81, and a fan-foldable informational sheet 90 that is attached to sleeve 81 and that can be accordionized into a compacted condition adjacent sleeve 81 as desired.

In other embodiments, informational sheet 90 may be placed into a compacted condition by way of being spiral-wound around sleeve 81. Such a sheet 90 will be at least partially unwindable to an at least partially extended condition when it is desired to consult the information present on sheet 90 or to add additional information to sheet 90 if desired. An exemplary spiral-wound condition of an informational sheet 90 is depicted in FIG. 7*a*. By definition, a spiral-wound sheet is one that is wound (circumferentially wrapped) around at least 90% of the circumferential extent of sleeve 81, at least at one location along the elongate extent of sleeve 81. In various embodiments, sheet 90 may be spiral-wound such that, at least at one location along the circumference of sleeve 81, sheet 90 is present in two, three, four, five, or more radially-overlapping layers. (A spiral-wound condition does not necessitate that a sheet must be wound as tightly as the exemplary spiral-wound arrangement shown in FIG. 7*a*.) Sheet 90 may be unwound from a spiral-wound condition e.g. by pulling on terminal end 92 of sheet 90 to cause sleeve 81 to rotate about cable 20. Or, e.g. if sleeve 81 is not easily rotatable about the section of cable 20 that sleeve 81 is located on, sleeve 81 may remain generally stationary while sheet 90 is manually unwound (unwrapped) from sleeve 81 as desired.

Sheet 90 may exhibit any suitable width (along the long axis of sleeve 81), and any suitable length (i.e., the distance from attachment end 91 to terminal end 92). Providing sheet 90 in a spiral-wound condition (or, in general, in any compacted condition) can allow the length, and the resulting usable area, of sheet 90 to be relatively large e.g. in relation to the usable area that might be available on an informational label that is adhered to housing 51 of base unit 50 or is affixed to fastener 40 or to cable 20 itself. Moreover, if desired, information may be placed on both major surfaces 93 and 94 of sheet 90. It will thus be appreciated that the arrangements disclosed herein can advantageously allow a large amount of information to be presented.

In various embodiments, the width of sheet 90 may be at least about 1, 2, 3 or 4 inches; in further embodiments, the width of sheet 90 may be at most about 4.5, 3.5, or 2.5 inches. In various embodiments, the length of sheet 90 (when fully unrolled as in FIG. 8) may be at least about 2, 3, 4, 6, 8, 10 or 12 inches; in further embodiments, the length of sheet 90 may be at most about 18, 14, 10, 9, 7, 5, or 3 inches. Informational sheet 90 may comprise any suitable size and aspect (length/width) ratio. In various embodiments, the length-width aspect ratio of sheet 90 may be at least about 1.5, 2.0, 3.0, or 4.0.

In some embodiments, sheet 90 may inherently assume a condition that is at least generally flat (planar) unless force is exerted to wind sheet 90 up into a spiral-wound condition. In other embodiments, sheet 90 may be self-winding, meaning that sheet 90 is biased to spontaneously curl up around sleeve 81 into a spiral-wound condition (e.g. as in FIG. 7*a*) unless a force is applied to unwind sheet 90 into an at least partially unwound condition or to a fully unwound condition (as in FIGS. 7*b* and 8) and to maintain sheet 90 in the unwound condition. As defined herein, a self-winding sheet is one that, when obtained as a sheet (e.g. of 3" width and 12" length) and placed on a horizontal planar surface without being constrained, will spontaneously curl up into a self-wound roll that exhibits an at least generally cylindrical shape with a radius of curvature of less than 2.0 inches. In various embodiments, such a self-winding sheet, when obtained as a sheet of 3" width and 12" length, will exhibit an unconstrained (i.e., in the absence of a sleeve 81) self-curl that results in a radius of curvature of less than 1.5 inches, 1.0 inches, 0.75 inches, or 0.5 inches. In specific embodiments, such a self-winding sheet, when obtained as a sheet of this size, will exhibit an unconstrained self-curl that results in a radius of curvature that is less than the outer radius of a sleeve 81 upon which the sheet will be spiral-wound. In some embodiments, such a self-winding sheet may be e.g. a "pre-stressed" sheet material of the general type described in U.S. Pat. No. 4,123,789. Suitable self-winding sheet materials may be chosen from products such as e.g. those available from Brimar Industries, Garfield, NJ, under the trade designation SYSTEM 1 PIPE MARKER (WRAP-AROUND).

Figure 9:
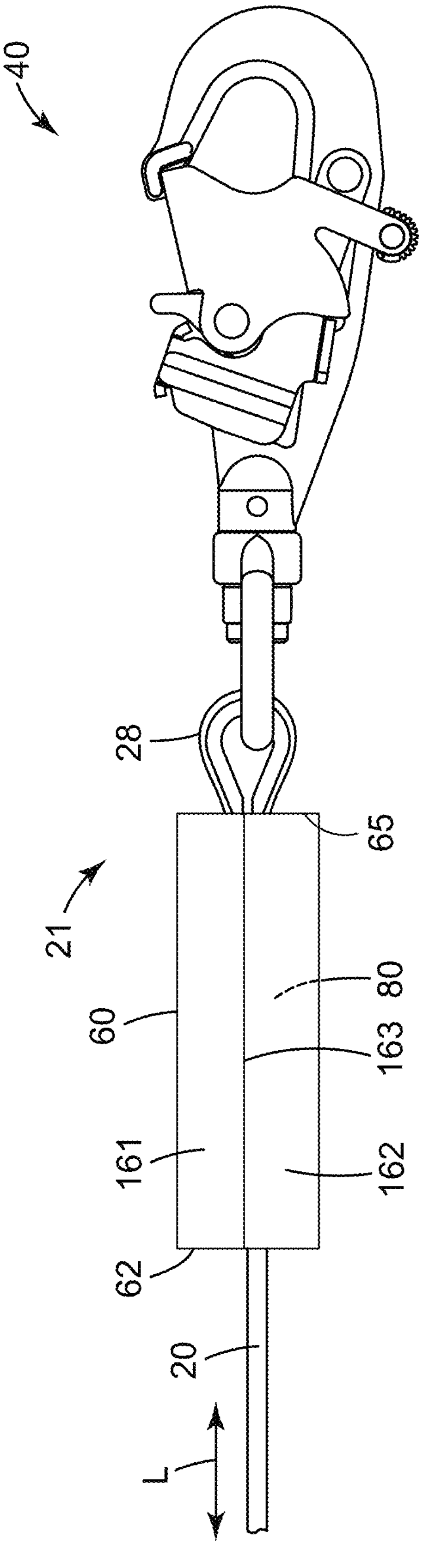
FIG. 9 is a side view of a first end of a cable of an exemplary fall-protection apparatus, with a protective shroud and sleeve assembly in place, the protective shroud comprising a clamshell structure with a hinge.
Figure 10:
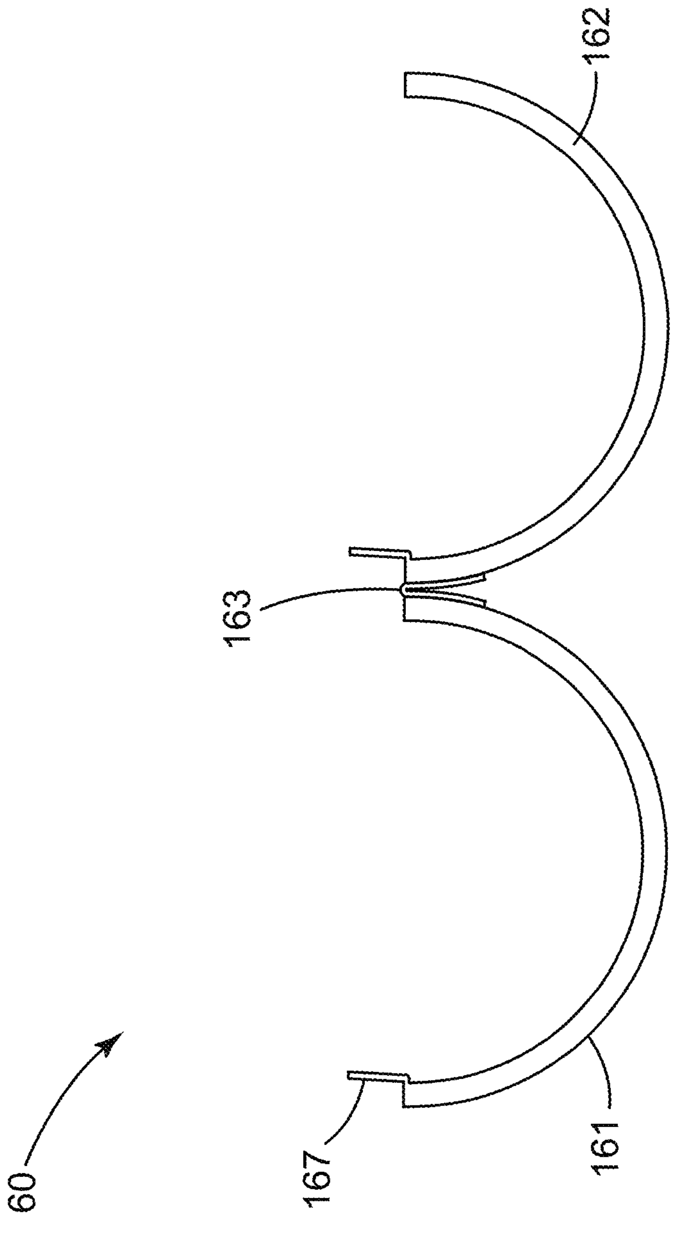
FIG. 10 is a view of the exemplary clamshell shroud of FIG. 9, viewed along the long axis of the shroud.
Figure 11:
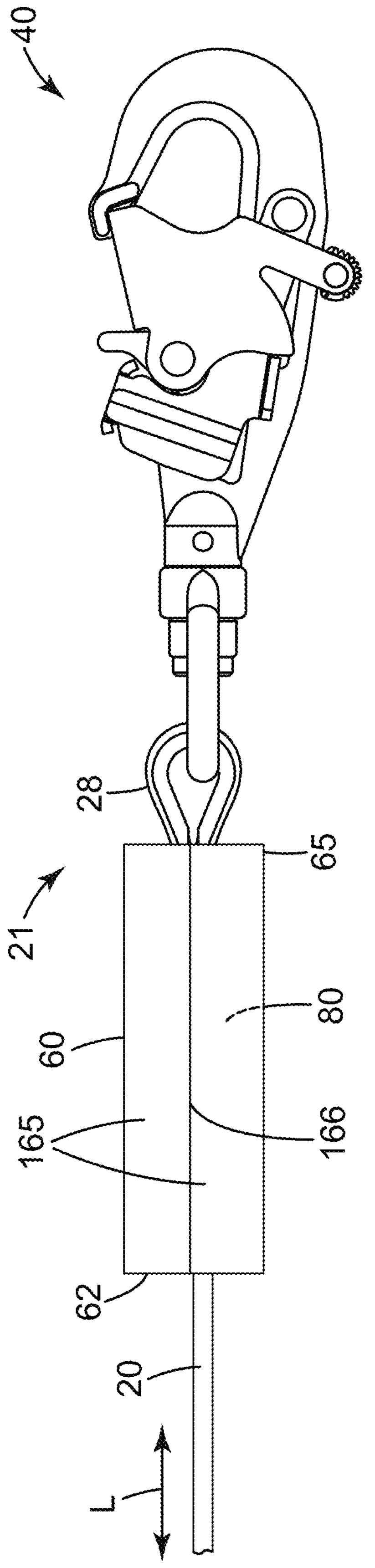
FIG. 11 is a side view of a first end of a cable of an exemplary fall-protection apparatus, with a protective shroud and sleeve assembly in place, the protective shroud comprising a clamshell structure with a living hinge.

In some embodiments, protective shroud 60 may take the form of a clamshell structure that can be opened, mounted on cable 20, and closed and latched or otherwise secured in the closed position, to provide shroud 60 in the general manner depicted in FIGS. 9-11. Such a structure may be provided e.g. by two elongate pieces 161 and 162 that are joined together along one edge to form a hinge 163 as with shroud 60 of FIGS. 9 and 10; or, such a structure might comprise a single elongate molded piece 165 that includes a living hinge 166 as with shroud 60 of FIG. 11. An opposing edge of the structure can then comprise e.g. one or more latches 167, press-fittings, or the like, e.g. as shown in FIG. 10, so that the protective shroud can be secured in place on cable 20. (Such a clamshell structure may resemble, for example, the arrangement depicted in FIG. 5 of U.S. Pat. No. 8,069,623, which is incorporated by reference herein for this purpose.)

In some embodiments, such a "clamshell" protective shroud 60 may function in the same manner as described earlier herein; that is, the shroud may be slidably movable along cable 20, in a direction aligned with the longitudinal axis of cable 20 and aligned with a long axis of the clamshell protective shroud, in order to accomplish the hiding/exposing of sleeve assembly 80. In other words, in some embodiments the functioning, and many of the geometric parameters and properties, of a clamshell shroud may be very similar to those described above for non-clamshell (e.g. integrally-molded) shrouds.

However, in other embodiments a clamshell protective shroud 60 may be movable relative to sleeve assembly 80 to hide/expose the sleeve assembly, by way of moving (manipulating) one or more portions of the clamshell structure rather than by slidably moving the entire clamshell structure along cable 20. For example, such a manipulation may involve moving one or more portions of the clamshell in a radially outward direction (e.g., unlatching at least a portion of the clamshell and opening it up) sufficiently far to expose at least a terminal end of the informational sheet so that the informational sheet may be extended to any extent desired. So, while the discussions herein have mainly concerned the slidable moving of a protective shroud and a sleeve assembly relative to each other along a cable on which they are mounted, it is emphasized that the concepts disclosed herein encompass those in which the moving of a protective shroud and a sleeve assembly relative to each other (and the movement of a protective shroud relative to a cable) occurs in some manner other than by slidable movement of the shroud along the cable on which the shroud and sleeve assembly are mounted. It will be understood however that any protective shroud (e.g. a clamshell shroud) that is used in this manner may share many of the properties and attributes described herein; all of the preceding descriptions of e.g. geometric parameters of shrouds, will thus be understood to be applicable to clamshell protective shrouds.

In some embodiments, sleeve assembly 80 may optionally comprise one or more retainers 96 that can assist in maintaining informational sheet 90 in a spiral-wound (e.g., a tightly spiral-wound) condition. Such a retainer can be of any suitable configuration and can operate by any suitable mechanism that tends to restrain or inhibit sheet 90 from unwinding from a spiral-wound condition. For example, a retainer might take the form of one or more adhesive areas (e.g. a strip of repositionable pressure-sensitive adhesive tape) that are adhered to a major surface of sheet 90 at a position proximate terminal end 92 of sheet 90. Or, a retainer might take the form of a self-attaching strap (e.g. of the kind that is often attached to an umbrella as supplied, and that can be wound around the folded umbrella and self-fastened to hold the umbrella in a folded condition) that includes a snap (button) fastener, a hook and loop fastener, or the like. In still other embodiments, a retainer might take the form of a retaining cap, comprising e.g. a bushing with a radially-outwardly-extending flange and with a retaining lip that is provided at the radially outwardmost edge of the flange along at least a portion of the circumference of the flange. Such a retaining cap may be annularly mounted on cable 20 adjacent an end of sleeve 81. The bushing portion of the cap may be sized so that it can be slidably inserted into an end opening (83 or 86) of sleeve 81, with the retaining lip extending inward along the long axis of sleeve 81 so that it faces toward spiral-wound sheet 90. If such a retaining cap is to be used, informational sheet 90 can be spiral-wound (e.g. to a condition as shown in FIG. 7*a*), after which the bushing of the retaining cap can be slidably inserted (press-fit) into an opening of sleeve 81 so that the retaining lip radially outwardly overlaps an edge of spiral-wound sheet 90 to assist in retaining sheet 90 in a spiral-wound condition.

As noted earlier herein, in some embodiments protective shroud 60, in addition to protecting sleeve assembly 80, may also serve to protect at least one fitting of cable 20 and/or the first-end terminus 26 of cable 20. Also as noted, in some embodiments protective shroud 60 may serve as a "bumper" to prevent fastener 40 (or in general, any fitting or other item present at first end 21 of cable 20) from contacting housing 51 of base unit 50 when cable 20 is retracted onto reel 23 of base unit 50. In some other embodiments which are optional, protective shroud 60 may serve to protect sleeve assembly 80 (and may also serve as a bumper) while not serving to protect fittings, the first-end terminus of cable 20, or any other items present at first end 21 of cable 20. That is, in such embodiments the herein-described shroud 60 may be a primary protective shroud which houses and protects a sleeve assembly 80 as described herein. In addition to this primary shroud, a secondary protective shroud may be present e.g. solely for the purpose of protecting fittings, a first-end terminus of cable 20, and/or any other items present at first end 21 of cable 20. In such embodiments, primary protective shroud 60 (and sleeve assembly 80) will be mounted on cable 20 in a position rearward of the secondary protective shroud and both the primary protective shroud 60 and sleeve assembly 80 will be slidably movable along cable 20 to allow the secondary shroud to be slidably moved along cable 20 sufficiently far rearward to e.g. inspect the fittings at first end 21 of cable 20. If present, such a secondary shroud may be of any suitable design.

If desired, protective shroud 60 may comprise an indicia (e.g. an arrow 72 as shown in FIG. 4) which indicates a direction that shroud 60 may be slidably moved along cable 20 in order to expose sleeve assembly 80 to consult informational sheet 90. Instead of this, or in addition to this, a label may be provided e.g. on a base unit 50 of fall-protection apparatus 1, that informs a user to slidably move shroud 60 in order to consult informational sheet 90.

LIST OF EXEMPLARY EMBODIMENTS

Embodiment 1 is a fall-protection apparatus, comprising: a load-bearing cable with an elongate length and a longitudinal axis and with a first end comprising a fastener; a protective shroud that is annularly mounted on the load-bearing cable at a position proximate the first end of the cable, that is configured to be slidably movable along at least a portion of the cable, and that comprises a through-passage that is aligned with a long axis of the protective shroud and with the longitudinal axis of the cable and through which an elongate section of the cable extends; and, a sleeve assembly comprising a sleeve that is annularly mounted on the cable at a position proximate the first end of the cable and an informational sheet that is connected to the sleeve and that is configured to be compactable and expandable between a compacted condition and an at least partially extended condition, wherein the protective shroud and the sleeve assembly are configured to be slidably movable relative to each other along the cable, along a direction aligned with the long axis of the protective shroud, between at least a first configuration in which the sleeve assembly resides within the through-passage of the protective shroud with the informational sheet in a compacted condition, and a second configuration in which the sleeve assembly resides outside the through-passage of the protective shroud so that the informational sheet can be extended into an at least partially extended condition.

Embodiment 2 is the fall-protection apparatus of embodiment 1, the fall-protection apparatus further comprising a base unit with which the load-bearing cable is engaged.

Embodiment 3 is the fall-protection apparatus of embodiment 2, wherein the fall-protection apparatus is a self-retracting lifeline and wherein the base unit comprises a housing and a reel that is rotatably connected to the housing, and wherein a second end of the load-bearing cable is attached to the reel of the base unit of the self-retracting lifeline.

Embodiment 4 is the fall-protection apparatus of any of embodiments 1-3 wherein the fastener is a hook comprising a hingedly openable gate.

Embodiment 5 is the fall-protection apparatus of any of embodiments 1-4 wherein a terminal section of the load-bearing cable is looped back into contact with a penultimate section of the cable to form a terminal loop at the first end of the cable, from which terminal loop the fastener extends, and wherein the terminal section of the cable is joined to the penultimate section of the cable to form a junction of the terminal section of the cable and the penultimate section of the cable; and, wherein at least the protective shroud is slidably movable along the cable into a co-shielding position in which the sleeve assembly and the protective shroud are in the first configuration and in which the junction of the cable resides within the through-passage of the protective shroud and in which at least a portion of the junction of the cable resides within a through-passage of the sleeve of the sleeve assembly.

Embodiment 6 is the fall-protection apparatus of embodiment 5 wherein the terminal section of the cable is joined to the penultimate section of the cable to form the junction of the cable by way of at least one compression fitting, by being spliced to the penultimate section, by being stitched to the penultimate section, or by any combination of any of these.

Embodiment 7 is the fall-protection apparatus of embodiment 6 wherein when the sleeve assembly and the protective shroud are in the co-shielding position, at least one compression fitting of a junction of the cable resides with a through-passage of the protective shroud and at least a portion of the at least one compression fitting resides within a through-passage of the sleeve assembly.

Embodiment 8 is the fall-protection apparatus of any of embodiments 1-7 wherein an attachment end of the informational sheet is attached to the sleeve and wherein the informational sheet is configured to be spirally-windable about a radially outer surface the sleeve; and, wherein the protective shroud and the sleeve assembly are configured to be slidably movable relative to each other along the cable between at least the first configuration, in which the sleeve assembly resides within the through-passage of the protective shroud with the informational sheet in a spiral-wound condition, and the second configuration, in which the sleeve assembly resides outside the through-passage of the protective shroud so that the informational sheet is unwindable into an at least partially unwound condition.

Embodiment 9 is the fall-protection apparatus of embodiment 8 wherein the attachment end of the informational sheet is attached to the radially outer surface of the sleeve by a pressure-sensitive adhesive.

Embodiment 10 is the fall-protection apparatus of any of embodiments 8-9 wherein the informational sheet is spiral-wound around the radially outer surface of the sleeve to provide at least three radial layers of the informational sheet.

Embodiment 11 is the fall-protection apparatus of any of embodiments 8-10 wherein the informational sheet is a self-winding sheet that is biased to curl up around the sleeve into a spiral-wound configuration unless a force is applied to unwind the sheet into an unwound configuration and to maintain the sheet in the unwound configuration.

Embodiment 12 is the fall-protection apparatus of any of embodiments 8-11 wherein a terminal section of the load-bearing cable is looped back into contact with a penultimate section of the cable to form a terminal loop at the first end of the cable, from which terminal loop the fastener extends, and wherein the terminal section of the cable is joined to the penultimate section of the cable to form a junction of the terminal section of the cable and the penultimate section of the cable; and, wherein at least the protective shroud is slidably movable along the cable into a first arrangement in which the protective shroud and the sleeve assembly are in their second configuration so that the informational sheet is unwindable into an at least partially unwound configuration, and in which first arrangement the sleeve assembly is in a shielding position in which at least a portion of the junction of the cable resides within a through-passage of the sleeve of the sleeve assembly but in which first arrangement the protective shroud is in a non-shielding position in which no portion of the junction of the cable resides within the through-passage of the protective shroud.

Embodiment 13 is the fall-protection apparatus of any of embodiments 8-12 wherein the protective shroud and the sleeve assembly are each slidably movable along the cable into a second arrangement in which the protective shroud and the sleeve assembly are in their second configuration so that the informational sheet is unwindable into an at least partially unwound configuration, and in which second arrangement the sleeve assembly is in a non-shielding position in which no portion of the junction of the cable resides within the through-passage of the sleeve of the sleeve assembly, and in which second arrangement the protective shroud is in a non-shielding position in which no portion of the junction of the cable resides within the through-passage of the protective shroud.

Embodiment 14 is the fall-protection apparatus of any of embodiments 8-13 wherein the protective shroud comprises a first, fastener-facing end with a first opening and a second, oppositely-facing end with a second opening that is smaller in size than the first opening, and wherein the first and second openings and an interior cavity therebetween, collectively define the through-passage of the protective shroud.

Embodiment 15 is the fall-protection apparatus of embodiment 14 wherein the informational sheet is spirally-windable about the radially outer surface of the sleeve into a spiral-wound condition in which the sleeve assembly exhibits an outer diameter, wherein the first opening of the protective shroud is sized so that the sleeve assembly bearing the informational sheet in a spiral-wound condition can pass through the first opening to enter the through-passage of the protective shroud, and wherein the second opening of the protective shroud is sized so that the sleeve assembly bearing the informational sheet in a spiral-wound condition cannot pass through the second opening to exit the through-passage of the protective shroud.

Embodiment 16 is the fall-protection apparatus of any of embodiments 14-15 wherein the first, fastener-facing end of the protective shroud comprises a radially-outwardly-flared skirt that comprises a radially inward-facing surface that that defines the first opening of the first, fastener-facing end of the protective shroud, and wherein the second, oppositely-facing end of the protective shroud comprises a radially-inwardly-tapered nose, and wherein the protective shroud is comprised of a molded, resilient organic polymeric material with a Shore A durometer of less than 70.

Embodiment 17 is the fall-protection apparatus of any of embodiments 14-16 wherein when the protective shroud and the sleeve assembly are in a co-shielding position in which the sleeve assembly and the protective shroud are in the first configuration and in which a junction of the cable resides within the through-passage of the protective shroud and in which at least a portion of the junction of the cable resides within a through-passage of the sleeve of the sleeve assembly, a surface of the protective shroud that defines the first opening of the first, fastener-facing end of the protective shroud, radially outwardly abuts a radially outward surface of an annular spacer disk that is mounted on the cable between the junction of the cable and the terminal loop of the cable to provide a friction fit between the first end of the protective shroud and the annular spacer disk, which friction fit acts to keep the protective shroud in a shielding position unless force is exerted by a user to move the protective shroud away from the first end of the cable and away from the shielding position.

Embodiment 18 is the fall-protection apparatus of any of embodiments 1-17 wherein the sleeve of the sleeve assembly is an annular tube comprised of a molded or extruded organic polymeric material.

Embodiment 19 is the fall-protection apparatus of any of embodiments 1-18 wherein an outer surface of the protective shroud comprises at least one indicia that indicates that the protective shroud can be slidably moved along the cable away from the first end of the cable, in order to expose the sleeve assembly so that the informational sheet can be extended from a compacted condition to an at least partially extended condition.

Embodiment 20 is the fall-protection apparatus of any of embodiments 1-19 wherein when the protective shroud and the sleeve assembly are in the first configuration, the protective shroud annularly surrounds the sleeve assembly and the sleeve of the sleeve assembly annularly surrounds an elongate section of the cable that extends through a through-passage of the sleeve of the sleeve assembly.

Embodiment 21 is the fall-protection apparatus of any of embodiments 1-20 wherein the informational sheet contains printed information on at least one area of at least one major surface of the informational sheet, and wherein the informational sheet comprises at least one area of one major surface that is configured to receive handwritten information on a writable surface thereof.

Embodiment 22 is a fall-protection apparatus, comprising: a load-bearing cable with an elongate length and a longitudinal axis and with a first end comprising a fastener; a protective shroud that is annularly mounted on the load-bearing cable at a position proximate the first end of the cable, that is configured to be movable relative to the cable, and that comprises a through-passage that is aligned with a long axis of the protective shroud and with the longitudinal axis of the cable and through which an elongate section of the cable extends; and, a sleeve assembly comprising a sleeve that is annularly mounted on the cable at a position proximate the first end of the cable and an informational sheet that is connected to the sleeve and that is configured to be compactable and expandable between a compacted condition and an at least partially extended condition, wherein the protective shroud and the sleeve assembly are configured to be movable relative to each other, between at least a first configuration in which the sleeve assembly resides within the through-passage of the protective shroud with the informational sheet in a compacted condition, and a second configuration in which the sleeve assembly resides outside the through-passage of the protective shroud so that the informational sheet can be extended into an at least partially extended condition.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. The description of certain embodiments as optional is for emphasis and does not imply that other embodiments are not optional. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

What is claimed is:

1. A fall-protection apparatus, comprising:

a load-bearing cable with an elongate length and a longitudinal axis and with a first end comprising a fastener;

a protective shroud that is annularly mounted on the load-bearing cable at a position proximate the first end of the cable, that is configured to be movable relative to the cable, and that comprises a through-passage that is aligned with a long axis of the protective shroud and with the longitudinal axis of the cable and through which an elongate section of the cable extends; and, a sleeve assembly comprising a sleeve that is annularly mounted on the cable at a position proximate the first end of the cable and an informational sheet that is connected to the sleeve and that is configured to be compactable and expandable between a compacted condition and an at least partially extended condition, wherein the protective shroud and the sleeve assembly are configured to be movable relative to each other, between at least a first configuration in which the sleeve assembly resides within the through-passage of the protective shroud with the informational sheet in a compacted condition, and a second configuration in which the sleeve assembly resides outside the through-passage of the protective shroud so that the informational sheet can be extended into an at least partially extended condition.

2. The fall-protection apparatus of claim 1 wherein the protective shroud comprises a clamshell structure that is annularly mounted on the load-bearing cable, wherein the first configuration of the protective shroud and the sleeve assembly corresponds to the clamshell structure being in a closed position, and wherein the protective shroud is movable relative to the load-bearing cable and to the sleeve assembly to a second configuration, by way of the clamshell structure being opened from the closed position.

3. The fall-protection apparatus of claim 2 wherein the clamshell structure comprises a latch so that the clamshell structure can be latched in the closed position.

4. The fall-protection apparatus of claim 2 wherein the clamshell structure takes the form of two elongate pieces that are joined together along one edge to form a hinge that allows the clamshell structure to be opened and closed.

5. The fall-protection apparatus of claim 2 wherein the clamshell structure takes the form of a single elongate molded piece that includes a living hinge that allows the clamshell structure to be opened and closed.

6. The fall-protection apparatus of claim 1, the fall-protection apparatus further comprising a base unit with which the load-bearing cable is engaged.

7. The fall-protection apparatus of claim 6, wherein the fall-protection apparatus is a self-retracting lifeline and wherein the base unit comprises a housing and a reel that is rotatably connected to the housing, and wherein a second end of the load-bearing cable is attached to the reel of the base unit of the self-retracting lifeline.

8. The fall-protection apparatus of claim 1 wherein the fastener is a hook comprising a hingedly openable gate.

9. The fall-protection apparatus of claim 1 wherein a terminal section of the load-bearing cable is looped back into contact with a penultimate section of the cable to form a terminal loop at the first end of the cable, from which terminal loop the fastener extends, and wherein the terminal section of the cable is joined to the penultimate section of the cable by way of at least one compression fitting to form a junction of the terminal section of the cable and the penultimate section of the cable; and, wherein when the sleeve assembly and the protective shroud are in the first configuration, at least one compression fitting of the junction cable resides with a through-passage of the protective shroud and at least a portion of the at least one compression fitting resides within a through-passage of the sleeve assembly.

10. The fall-protection apparatus of claim 1 wherein an attachment end of the informational sheet is attached to the sleeve and wherein the informational sheet is configured to be spirally-windable about a radially outer surface of the sleeve; and, wherein the protective shroud and the sleeve assembly are configured to be movable relative to each other between at least the first configuration, in which the sleeve assembly resides within the through-passage of the protective shroud with the informational sheet in a spiral-wound condition, and the second configuration, in which the sleeve assembly resides outside the through-passage of the protective shroud so that the informational sheet is unwindable into an at least partially unwound condition.

11. The fall-protection apparatus of claim 10 wherein the attachment end of the informational sheet is attached to the radially outer surface of the sleeve by a pressure-sensitive adhesive.

12. The fall-protection apparatus of claim 10 wherein the informational sheet is spiral-wound around the radially outer surface of the sleeve to provide at least three radial layers of the informational sheet.

13. The fall-protection apparatus of claim 10 wherein the informational sheet is a self-winding sheet that is biased to curl up around the sleeve into a spiral-wound configuration unless a force is applied to unwind the sheet into an unwound configuration and to maintain the sheet in the unwound configuration.

14. The fall-protection apparatus of claim 10 wherein the protective shroud comprises a first, fastener-facing end with a first opening and a second, oppositely-facing end with a second opening that is smaller in size than the first opening, and wherein the first and second openings and an interior cavity therebetween, collectively define the through-passage of the protective shroud.

15. The fall-protection apparatus of claim 14 wherein the informational sheet is spirally-windable about the radially outer surface of the sleeve into a spiral-wound condition in which the sleeve assembly exhibits an outer diameter, wherein the first opening of the protective shroud is sized so that the sleeve assembly bearing the informational sheet in a spiral-wound condition can pass through the first opening to enter the through-passage of the protective shroud, and wherein the second opening of the protective shroud is sized so that the sleeve assembly bearing the informational sheet in a spiral-wound condition cannot pass through the second opening to exit the through-passage of the protective shroud.

16. The fall-protection apparatus of claim 14 wherein the first, fastener-facing end of the protective shroud comprises a radially-outwardly-flared skirt that comprises a radially inward-facing surface that that defines the first opening of the first, fastener-facing end of the protective shroud, and wherein the second, oppositely-facing end of the protective shroud comprises a radially-inwardly-tapered nose, and wherein the protective shroud is comprised of a molded, resilient organic polymeric material with a Shore A durometer of less than 70.

17. The fall-protection apparatus of claim 1 wherein the sleeve of the sleeve assembly is an annular tube comprised of a molded or extruded organic polymeric material.

18. The fall-protection apparatus of claim 1 wherein an outer surface of the protective shroud comprises at least one indicia that indicates that the protective shroud can be moved in order to expose the sleeve assembly so that the informational sheet can be extended from a compacted condition to an at least partially extended condition.

19. The fall-protection apparatus of claim 1 wherein when the protective shroud and the sleeve assembly are in the first configuration, the protective shroud annularly surrounds the sleeve assembly and the sleeve of the sleeve assembly annularly surrounds an elongate section of the cable that extends through a through-passage of the sleeve of the sleeve assembly.

20. The fall-protection apparatus of claim 1 wherein the informational sheet contains printed information on at least one area of at least one major surface of the informational sheet, and wherein the informational sheet comprises at least one area of one major surface that is configured to receive handwritten information on a writable surface thereof.

* * * * *